United States Patent [19]

Tardio et al.

[11] Patent Number: 5,140,255

[45] Date of Patent: Aug. 18, 1992

[54] AVERAGE POWER LEVEL CONTROLLER

[76] Inventors: Don Tardio, 6631 Paul-Pau, Montreal, Canada, H1K 4R7; David Bensoussan, 5170 Hingston, Montreal, Canada, H3X 3R4

[21] Appl. No.: 692,376

[22] Filed: Apr. 26, 1991

Related U.S. Application Data

[63] Continuation-in-part of Ser. No. 463,037, Jan. 10, 1989, abandoned.

[30] Foreign Application Priority Data

Oct. 1, 1989 [CA] Canada ................................. 587877

[51] Int. Cl.$^5$ .......................................... G05B 24/02
[52] U.S. Cl. .................................. 323/322; 323/241; 323/324
[58] Field of Search ............... 323/235, 237, 239, 241, 323/300, 319, 320, 322, 324

[56] References Cited

U.S. PATENT DOCUMENTS

| | | | |
|---|---|---|---|
| 4,119,905 | 10/1978 | Head | 323/326 |
| 4,122,382 | 10/1978 | Bernstein | 323/235 |
| 4,321,508 | 3/1982 | Adler et al. | 323/324 |
| 4,331,914 | 5/1982 | Huber | 323/324 |
| 4,353,025 | 10/1982 | Dobkin | 323/300 |
| 4,358,730 | 11/1982 | Beifus | 323/322 |
| 4,377,739 | 3/1983 | Eckert | 323/235 |
| 4,475,076 | 10/1984 | Chernotsky et al. | 323/300 |
| 4,596,947 | 6/1986 | Adler et al. | 323/243 |
| 4,686,630 | 8/1987 | Marsland et al. | 364/492 |
| 4,713,601 | 12/1987 | Zahn et al. | 323/324 |
| 4,823,069 | 4/1989 | Callahan et al. | 323/235 |
| 4,871,961 | 10/1989 | Kersten | 323/322 |
| 4,933,798 | 6/1990 | Widmayer et al. | 323/239 |
| 5,030,890 | 7/1991 | Johnson | 323/325 |

FOREIGN PATENT DOCUMENTS

| | | |
|---|---|---|
| 1090307 | 11/1980 | Canada . |
| 1118512 | 2/1982 | Canada . |
| 1128162 | 7/1982 | Canada . |
| 1187462 | 5/1985 | Canada . |

*Primary Examiner*—Steven L. Stephan
*Assistant Examiner*—Jeffrey Sterrett
*Attorney, Agent, or Firm*—Darby & Darby

[57] ABSTRACT

A controller associated with a dissipative electric load controls the level of average power applied to the load by an electric energy distribution network that supplies the dissipative load with a supply voltage. The controller comprises a detector for detecting a predetermined pulse duration modulation signal embedded in the level of the supply voltage provided by the distribution network, and a device for transmitting electric power originating from the distribution network to the load. The device for transmitting comprises a device for reducing the level of average power transmitted to the load, in response to a detection of said pulse duration modulation signal in the level of supply voltage. A decrease of the line voltage level for a given duration of power distribution voltage is initiated in order to control the average power consumption of the loads.

32 Claims, 9 Drawing Sheets

| PDM INFORMATION AND INTERPRETATION CHART | | | | |
|---|---|---|---|---|
| SIGNATURE | | | COERCIVE | NONCOERCIVE |
| Ta (sec) | Tb (sec) | Tc (sec) | THERMOSTAT'S ANSWER | |
| 90 | 180 | 60 | THERMOSTAT'S TEMP. LIMITED TO 20°C FOR 3 HRS | |
| 90 | 180 | 120 | THERMOSTAT'S TEMP. LOWERED BY 1°C FOR 3 HRS | |
| 120 | 180 | 30 | THERMOSTAT IS OFF FOR 2 HRS | |
| ... | ... | ... | ETC... | ... |

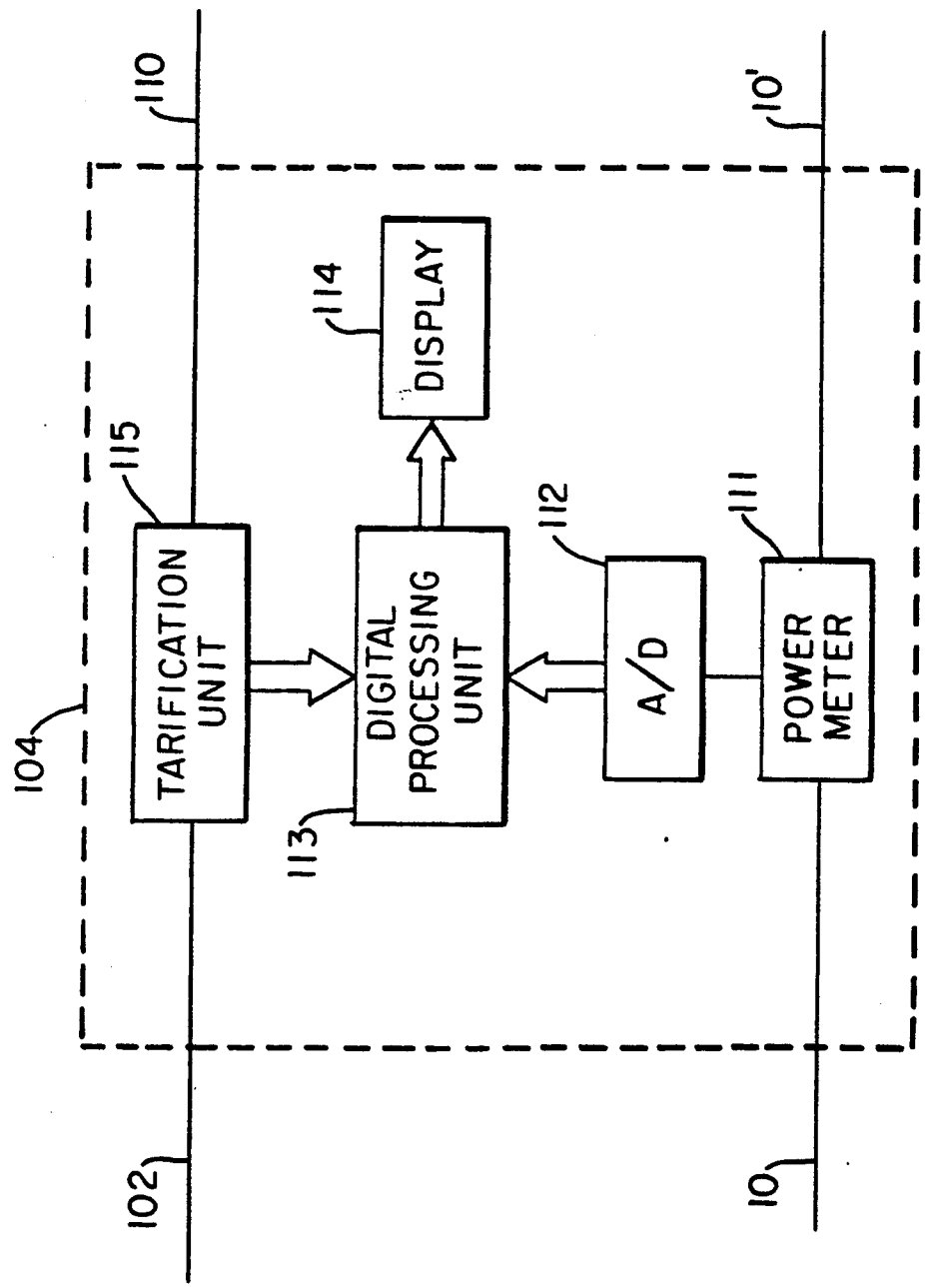

AVERAGE POWER LEVEL CONTROLLER

CROSS-REFERENCE TO COPENDING APPLICATIONS

This is a continuation-in-part of application Ser. No. 07/463,037, now abandoned.

FIELD OF THE INVENTION

The present invention relates to a controller for controlling the global consumption of electric power provided by a distribution network (and supplied to dissipative loads to be controlled), particularly during peak hours; and for controlling the scale of charges of an electricity meter in a residence.

BACKGROUND OF THE INVENTION

Various methods by which electric energy consumption can be decreased during peak hours have been proposed, for example:

(1) The bi-energy systems used by the Province of Quebec, in Canada, exemplify this by enabling a transition from electric heating to some other form of heating such as oil or gas, to occur during periods of low temperature. The capability of increased export, outside of Quebec, during periods of intense cold, further demonstrates the desirability of such bi-energy systems.

(2) Canadian patent No. 1.090.307 (CANN and AL), issued Nov. 25, 1980, proposes a transition from a furnace heating system to a heat pump controlled system.

(3) Canadian patent No. 1.187.462 (IVERSEN et. AL.), issued May 21, 1985, proposes a system based upon the combination of hot water heating and a heat pump.

However, there is a drawback with the bi-energy systems that are presently in operation, the transition from one type of energy to another is a function of the temperature. Furthermore, these bi-energy systems cannot be controlled at distance, by the electricity production companies, to reduce consumption when it is required to do so.

Another method that is known to effectively reduce the level of average power supplied by a distribution network involves a continuous lowering of the level of voltage during a generally lengthy interval of time (during peak hours, for example). However, this solution presents an inconvenience, other electric and electronic control devices supplied by the distribution network, such as motors, are disrupted.

Methods by which the applications of electric power to dissipative loads using high frequency modulated pulses superimposed to the voltage line at the consumer level have also been proposed.

Such methods are described in the Canadian patents No. 1.128.162 (BELCHER and AL), issued July 20, 1982, and No. 1.118.512 (CLEARY and AL), issued February 16, 1982. On a larger scale, however, such brief pulses may not be transmitted through the electric energy distribution network because they are filtered, i.e. they are blocked by the transformers.

Consequently, on electric power production and distribution network, a company will be unable to manage electricity consumption by its own distribution network by means of such transmitted pulses.

Load management methods through digitally encoded step voltage signals have been proposed in U.S. Pat. No. 4,686,630 (MARSLAND et. al.). Such a binary transmission involves many transitions which wear the electrical contact of the tap transformers used to that effect. The more sophisticated the transmission, the more the wear and the more are the chances of error in the transmission, which implies a reduced reliability of the transmission. Multilevel values of the average level of the power line voltage could also be used in order to diminish the number of bits needed for a given transmission. However, such a method would affect the lighting level in households and also wear faster the tap transformers.

SUMMARY OF THE INVENTION

The primary goal of the invention is to allow the electricity production and distribution company to control the level of average electric power applied to dissipative loads. This is achieved through a signal that is capable of being transmitted through the distribution network. This signal would not disrupt the functioning of other devices supplied by the distribution network.

Specifically, the present invention involves the association of a controller to an electric power dissipative load. The result of such an association would be the ability to control the level of average power applied to this load by the distribution network that supplied voltage to the dissipative load.

According to the present invention, there is provided a controller associated with a dissipative electric load, that controls the level of average power applied to the aforesaid load by an electric energy distribution network that supplies said dissipative load with a supply voltage, comprising:

(i) means for detecting a predetermined pulse duration modulation signal embedded in the level of the supply voltage provided by the distribution network; and (ii) means for transmitting electric power originating from the distribution network to the load, the aforesaid means for transmitting comprising means for reducing the level of average power transmitted to the load, in response to a detection of said pulse duration modulation signal in the level of supply voltage.

Disadvantages of the prior art could be overcome by using the present invention which modulates in time the duration of the voltage decrease of the power lines, and greatly enhances the possibility of initiating a greater number of selections of loads and appropriate actions to be initiated to each type of load while minimizing the number of transitions of the voltage level of the power lines.

The dissipative load may be, for example, an electric radiator, a hot water heater, or an lighting system.

Preferably, this reduction of average power occurs following a statistical delay that follows the detection of a pulse duration modulation signal in the voltage level. Alternatively, there could be a gradual decrease of average power following the detection.

Preferably, means by which a statistical delay could delay the passage from a reduced level of average power to a non-reduced level are contained within the controller. Alternatively, a return to the nominal average power can be initiated after another statistical delay.

According to the present invention, there is also provided a controller associated with a group of dissipative electric power loads that controls the level of average power applied to the aforesaid group by an electric energy distribution network that provides supply voltage to this group of dissipative loads, comprising:
  (i) means for detecting modulation signal in the level of supply voltage supplied by said electric energy distribution network; and
  (ii) means for transmitting electric power originating from the distribution network to said loads of the aforesaid group, the aforesaid means for transmitting comprise means for reducing the level of average power transmitted to the group of loads in response to a detection of said pulse duration modulation signal in the level of supply voltage.

According to a preferred embodiment of the invention, means for reducing the level of average power are comprised of means for interrupting the transmission of electric power to a load of the group, such as an electric heating system, and for transmitting electric power to a second load, also in the same group, that consumes less power than the first load. An example of the latter is a back-up heating system using a second energy source other than electricity.

According to the present invention, there is also provided a control system for controlling the level of average electric power applied to a dissipative load by an electric energy distribution network that provides a supply voltage to the dissipative load, comprising:
  (i) means for modulating a predetermined pulse duration modulation signal in the level of supply voltage provided by the distribution network; and
  (ii) a controller associated with the aforesaid load, comprising:
    (a) means for detecting the aforesaid pulse duration modulation signal in the level of supply voltage; and means for transmitting electric power, that originates from the distribution network to the load, the aforesaid means for transmitting comprising means for reducing the level of average power transmitted to said load when said pulse duration modulation signal in the level of supply voltage is detected.

According to the preferred embodiment of the present invention, the means by which a pulse duration modulation is produced in the supply voltage level comprise means for producing a decrease of voltage during a given duration in at least one of the transformation stations within the distribution network, by means of a tap changing transformer.

According to the present invention, there is also provided a method of controlling the level of average electrical power applied to dissipative loads by an electric energy distribution network that provides supply voltage to the aforesaid loads, comprises the following steps of:
  (i) modulation of a predetermined pulse duration modulation signal in the level of supply voltage provided by the distribution network to the dissipative loads, said duration modulation signal corresponding to at least one of said loads ;
  (ii) detection of the aforesaid pulse duration modulation signal in the level of supply voltage at the level of each of said dissipative loads; and
  (iii) reduction of electric power provided by the distribution network to said at least one load which corresponds to said pulse duration modulation signal.

Preferably, several different durations of the pulse duration modulation signal in the supply voltage level are produced. At least one duration is detected per load and the level of average power transmitted to each load is reduced only when the detected duration corresponds to this particular load.

The duration of the pulse duration modulation signal in the level of supply voltage may be implemented by region of the distribution network. These regions are preferably statistically chosen.

The different durations of the pulse duration modulation signal in the level of supply voltage constitute a control signal which is completely compatible with an electric energy distribution network. The signal may, in other words, be transmitted through the different equipments of a distribution network including transformers, such signal being easily produced.

According to the present invention, there is also provided a controller, associated with an electricity meter of a residence that measures consumption of electrical energy according to a predetermined scale of charges, comprising:
  means for detecting a predetermined pulse duration modulation signal in the level of supply voltage provided to said residence, and generating a signal accordingly; and
  means connected to said electricity meter for modifying said scale of charges when said signal is generated.

The following description of preferred embodiments will demonstrate advantages and other characteristics of the invention. This description is only one example of the many possible variations and it refers to the following drawings where:

FIG. 8B is a block diagram illustrating the electricity meter shown in FIG. 8A modified according to the present invention.

In the following description, the expression PDM signal means pulse duration modulation signal, and the expression sector means power line.

By PDM signal, we mean lowering the amplitude of the line voltage for a variable duration. Such a duration determines a message. In fact, we keep using the same frequency of the sector, say 60 Hz, while modifying its amplitude for a variable duration. Such a modulation of the line voltage could be termed an Amplitude Shift Keying (ASK), as we use two different amplitudes of the same 60 Hz. However, typical ASK modulation does not take into consideration the possibility that the transition to a second amplitude could be made for variable time. We therefore use the term PDM signal embedded in the level of the line voltage of the electrical distribution network.

Figure 1:
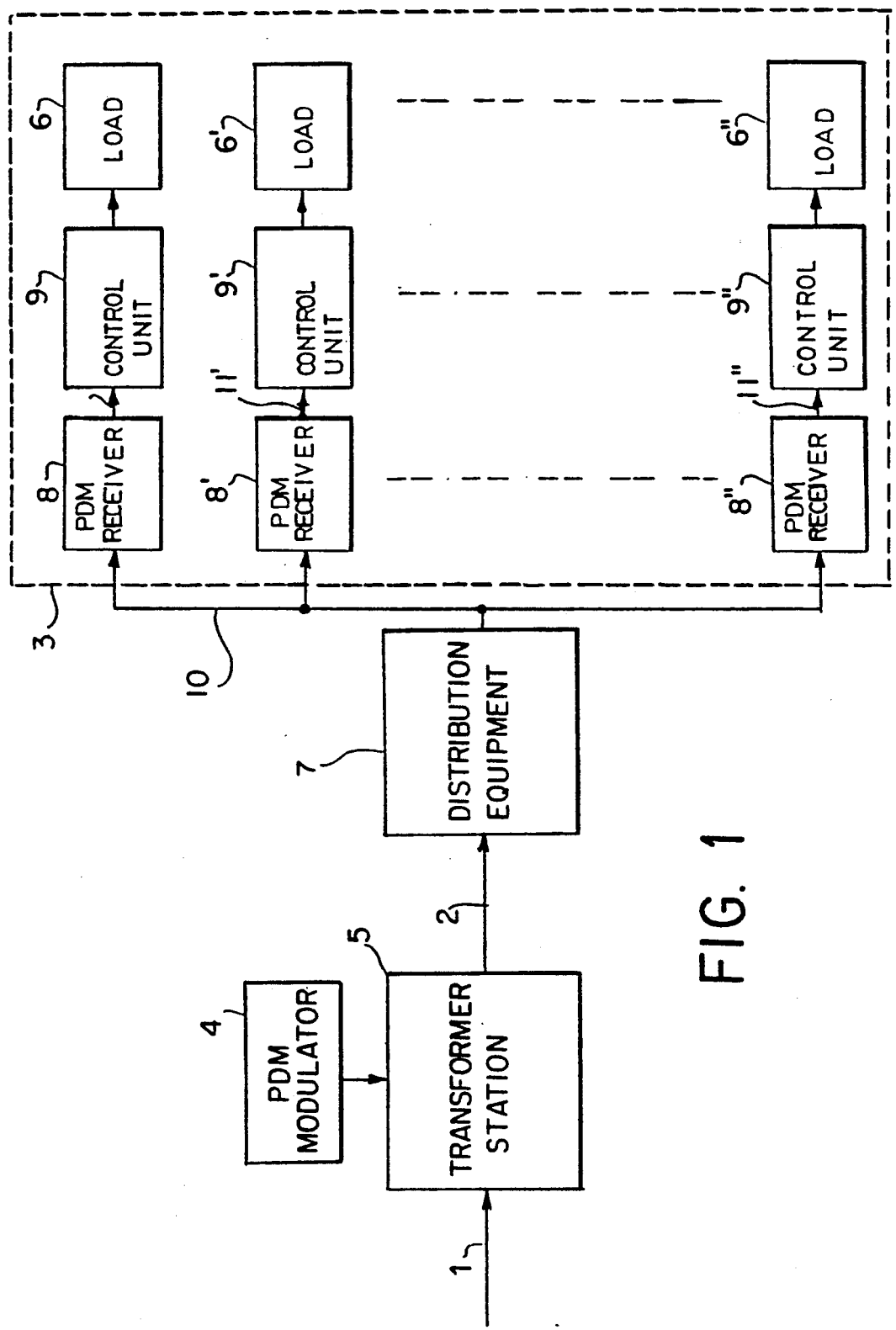
FIG. 1 is a block diagram of a system according to the present invention, that is conceived to control from a distance the level of average power that is applied to dissipative loads by an alternating current distribution network.

The control system according to the invention comprises, as shown in FIG. 1, a PDM modulator 4 connected to, for example, an intermediary transformer station or likewise within an electric energy distribution network. In order to produce a momentary decrease of the alternating voltage level across a distribution line 2. The transformer station 5 is fed by a high voltage line 1 originating from a central electric energy generator. The level of the supply voltage of the distribution line 2 is modified by the PDM modulator 4.

The voltage of the line 2 of the distribution network supplies a group 3 of dissipative electric power loads 6 such as electric radiators and water heaters. This is accomplished through the use of conventional electric energy distribution equipment 7 (distribution lines, transformers, etc.). Each dissipative load 6 is connected to a receiver 8 that detects a decrease in the voltage level in the sector 10. The reduction in amplitude of the voltage is transmitted to the sector 10 through equipment 7. In response to a decrease of the voltage level, the PDM receiver 8 delivers at its output 11 a command signal to a control unit 9 for controlling the average power applied to dissipative loads 6. The PDM receiver 8 and control unit 9 form an electronic controller of the average power level that is applied to the loads 6.

The PDM modulator 4 may lower the voltage level by different amplitudes for a variable period of time or repeatedly for a few times, for as long as it is acceptable for the loads supplied by that voltage whose amplitude has been reduced. The variation of the level of voltage may be gradual during a predetermined period of time. The detection at the level of the PDM receiver 8 therefore consists in an identification of the voltage gradient in the sector 10. An initial PDM signal detected by the PDM receiver 8 could, for example, indicate the beginning of a reduction in the average power supplied to the loads 6. This reduction will be maintained by a control unit 9 for either a pre-established delay or until the moment when the presence of a second PDM signal in the sector 10 is detected. When the voltage in the sector 10 fluctuates, the decrease in the level of voltage could be relative to the average voltage level.

As an example, modulation of the voltage distribution line 2 at the level of the transformation station 5 could consist in connecting to line 2 through appropriate switching, different outputs of a multiple secondary input power transformer. This switching may be performed between two outputs, nominal and not nominal, in order to produce on line 2, the desired reduction of the voltage drop. The switching may also be performed between several outputs in order to create the desired voltage gradient. This switching may be manually controlled or remote controlled. Such switching is widely known in the art and will therefore not be described any further.

As an example, the voltage in the sector 10 could shift from 220 volts to 209 volts or from 110 volts to 105 volts, depending upon the norms existing in different countries. This is done without disturbing the working of the different loads supplied by the sector 10. Generally, a 5% voltage decrease is acceptable and easily detectable.

The command signal present on the output 11 of the PDM receiver 8 may contain information relative to the application of the reduced average power to the loads 6 as well as to the duration of such a reduced power level. Alternatively, each control unit 9 may be designed to automatically apply a reduced level of average power to the loads 6 during a pre-established period of time. The latter would occur in response to a command signal from output 11. Furthermore, each command unit 9 may be designed to respond to an initial command output from the output 11 through the application of a reduced average power level to the loads 6, this initial command signal being generated by the PDM receiver 8 in response to an initial PDM signal, and to respond to a second command signal, again from the output 11, by reestablishing a normal supply to the loads 6. This second command would be generated by the PDM receiver 8 in response to a second PDM signal.

Different variations of voltage level for different fixed times constitute different PDM signatures to be delaminated by the PDM receiver. It is possible to dedicate a signature for a power reduction which might be overriden by the consumer. Other signatures for power reduction will be coercive, i.e. there would be no way for the consumer to override such a reduction.

Figure 2:
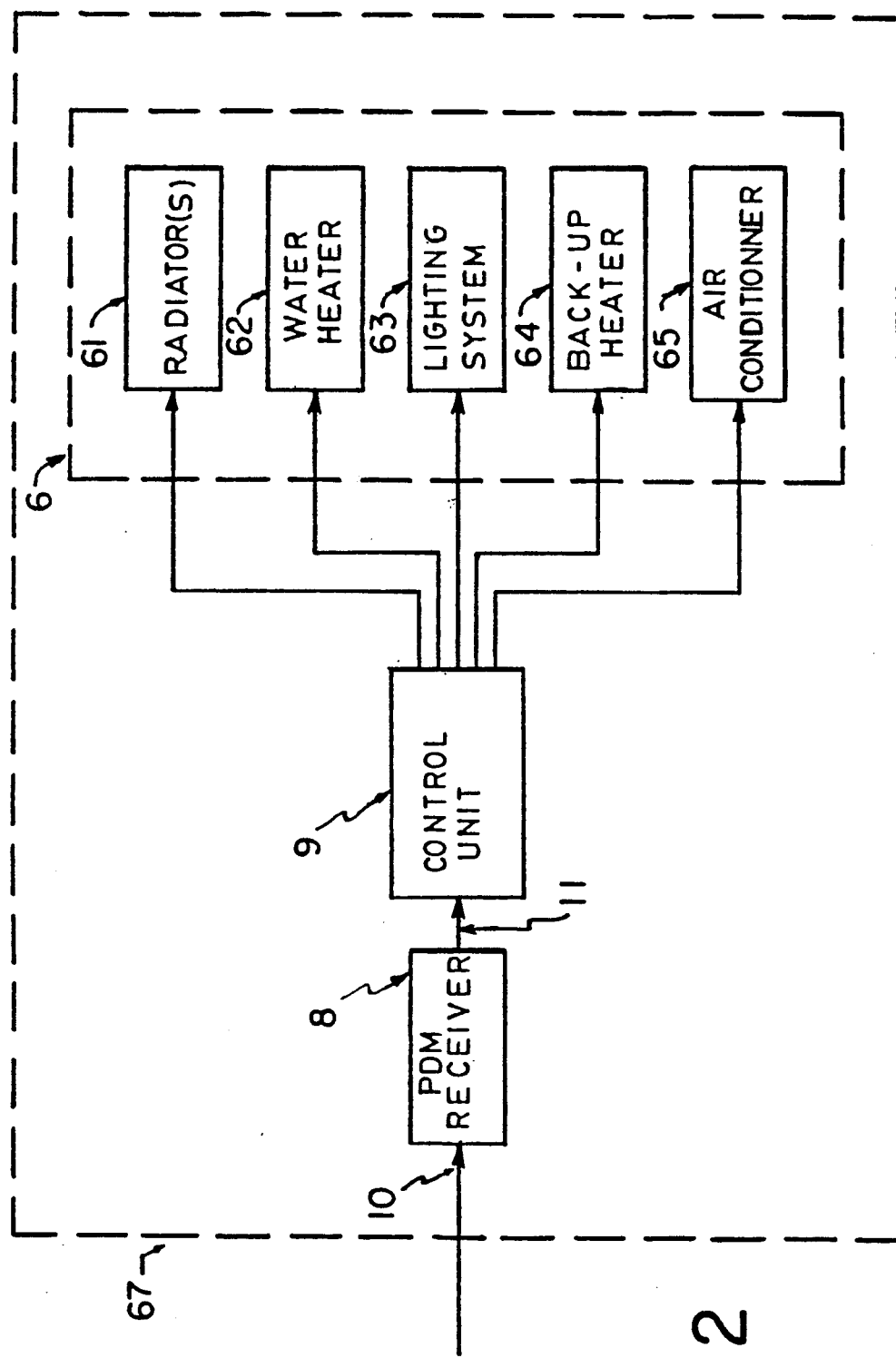
FIG. 2 is a block diagram of a variant of the system shown in FIG. 1.

Referring now to FIG. 2, there is shown one variation of the control system depicted in FIG. 1. Several dissipative electric power loads therefore constitute each of the loads 6. As shown in this FIG. 2, each of the loads 6 comprises at least one electric radiator 61, one water heater 62, one incandescent lighting system 63 and one back-up heater 64 as well as other heating systems, such as those based upon oil or gas.

The sector 10 could therefore be subjected to voltage level decreases having characteristics such as previously described, that enable the PDM receiver 8 to discriminate between these PDM signals for delivering at its output 11 different command signals. According to the command signals present at the output 11 of the PDM receiver 8, the control unit 9:

(1) may activate the back-up heater 64 and deactivate the electric radiator(s) 61 in order to reduce the electric power consumption by the loads 6, the control unit 9 acting, therefore, as a relay;

(2) may activate the back-up heater 64 while reducing the level of average power applied to the radiator(s) for reducing the whole power dissipated by the loads 6;

(3) may supply, in the form of reduced average power, either one of the loads 61 to 63 or simultaneously all of the loads 61 to 63 according to a pre-established time sequence that is either predetermined or controlled by the signal present at the output 11 of the PDM receiver 8; and (4) etc.

The air conditioner 65 is activated with respect to a reference temperature, the power control unit 9 having one of its output connected to the air conditioner 65 for increasing the reference temperature. The power control unit 9 may also have one of its output connected to the air conditioner 65 for limiting the reference temperature according to a predetermined maximum reference. Thus, the power control unit 9 can limit the nominal power of the air conditioner 65. For example, with an air conditioner 65 having five modes of operation, the power control unit 9 can prevent, upon the detection of a PDM signal in the level of the voltage supply, the operation of the air conditioner in its maximum mode of operation, or control the air conditioner so that it operates at a predetermined lower mode of operation. This control may be applied to other kinds of loads such as air blower and humidifier.

In a case where the air conditioner is controlled by a thermostat, the power control unit 9 can increase the reference temperature of the thermostat upon detection of a PDM signal in the level of the voltage supply. For example, the reference temperature can be increased by 2√ C., such raise in the reference temperature can provide a substantial reduction in electricity consumption.

Figure 3:
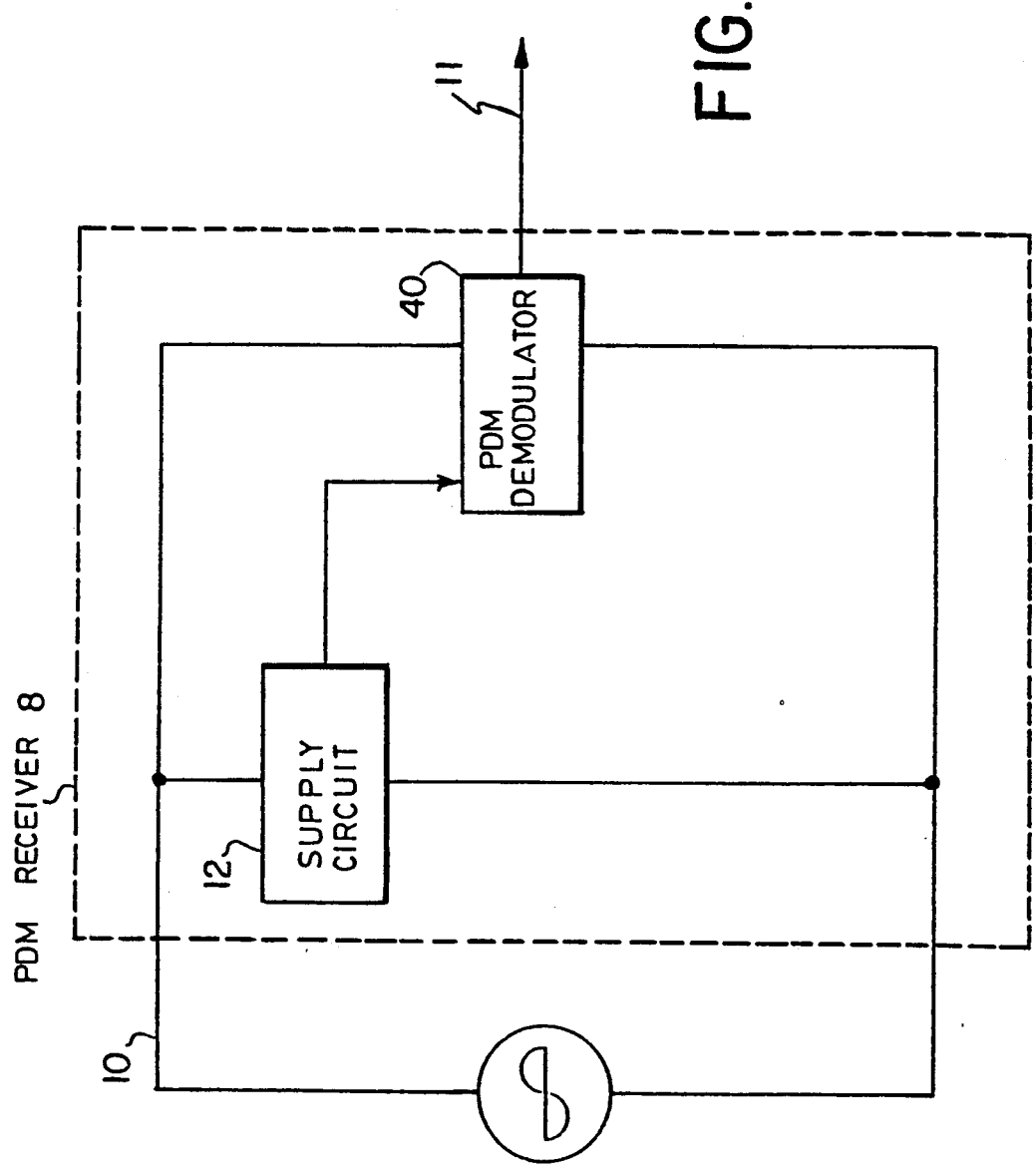
FIG. 3 is a block diagram representing one implementation of a receiver of the system shown in FIG. 1, such receiver being associated with each dissipative electric power load.

FIG. 3 represents a block diagram of an example of an embodiment of the PDM receiver 8 of the power control system shown by FIG. 1. The PDM receiver 8 comprises a PDM demodulator 40 that analyses and demodulates the characteristics of the PDM signal in the sector 10 and produces a command signal at the output 11 when the associated load 6 corresponds to the preselected type of PDM signal. The command signal may present any appropriate form allowing the command of the power control unit 9. A supply circuit 12 that produces a continuous voltage derived from the alternating voltage in the sector 10 supplies the demodulator 40 with electric energy.

Figure 4:
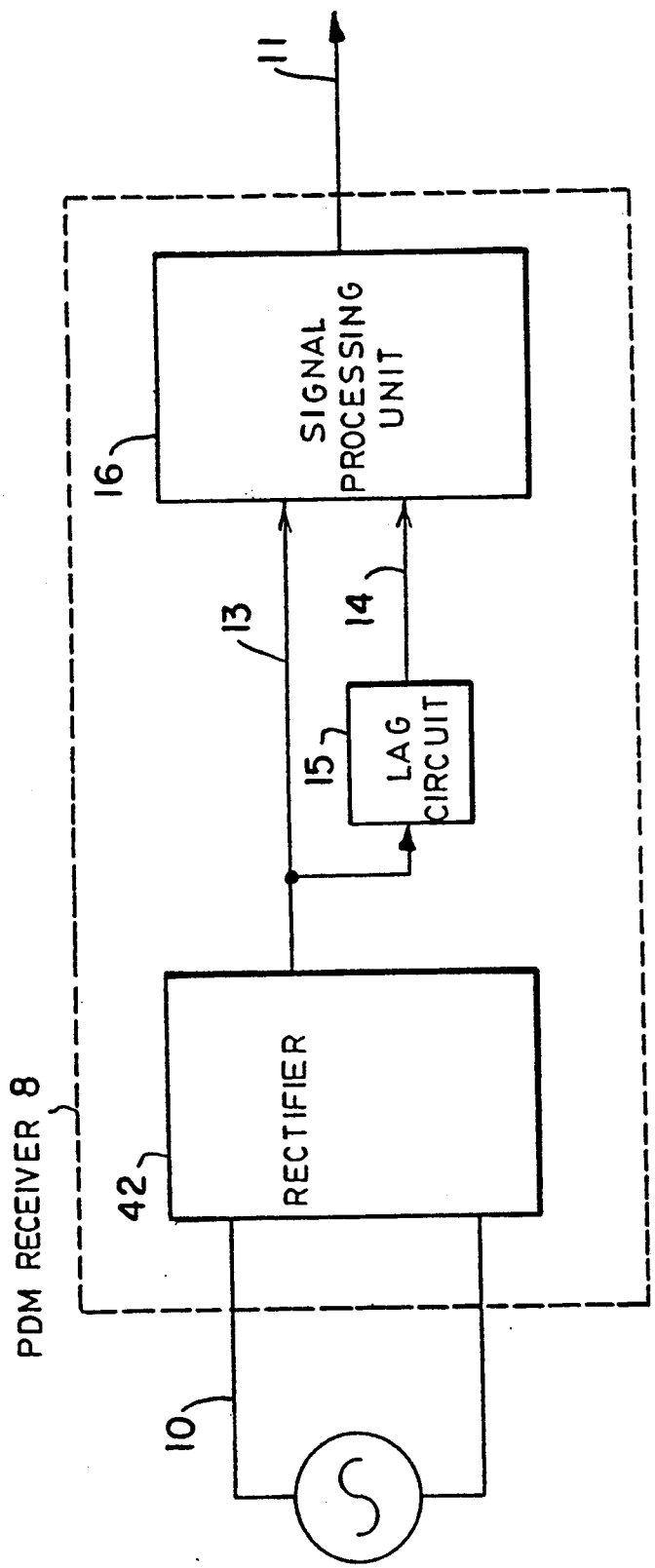
FIG. 4 is a block diagram depicting another type of embodiment of the receiver of the system shown in FIG. 1.

FIG. 4 illustrates as an example a block diagram of another implementation of the PDM receiver 8. Since the electric energy distribution networks are commonly alternating, the PDM receiver 8, depicted in FIG. 4 comprises a rectifier 42 (full wave or half-wave) which produces a direct current voltage that is representative of the alternating voltage level in the sector 10. The rectifier voltage supplies an input 13 of a signal processing unit 16 as well as a lag circuit 15 that produces a delayed direct voltage at the input 14 of unit 16. These two continuous voltages are then compared by signal processing unit 16 in order to determine the amplitude, the duration, the gradient of the PDM signal in the voltage level of the sector 10. This is accomplished to produce a command signal at the receiver output 11 if the amplitude, the duration, the gradient of the voltage decrease or the number of command signals corresponds to the associated load. The lag circuit 15 generates a delay that must be chosen in such a manner so that it allows the aforesaid detection of the amplitude, the duration and gradient of the voltage level decrease in the sector 10 as well the detection of all other forms of variation in the voltage level. The gradient of the voltage drop increase depends on the tap changing transformer limitations.

In FIGS. 3 and 4, the PDM receivers 8 could, for example, control a thermostat (unit 9) through which either an electric heater or a water heater is respectively fed, depending upon the temperature of the room that is to be heated or the water to which it is sensitive. The command signal at output 11 could therefore control a relay, an electronic switch, a monostable, or other forms of analog or logic circuits. It may also control a microprocessor that forms part of a thermostat in such a way that the thermostat reduces the average power level that is transmitted to either the electric heater or the water heater when they must be energized.

Figure 5:
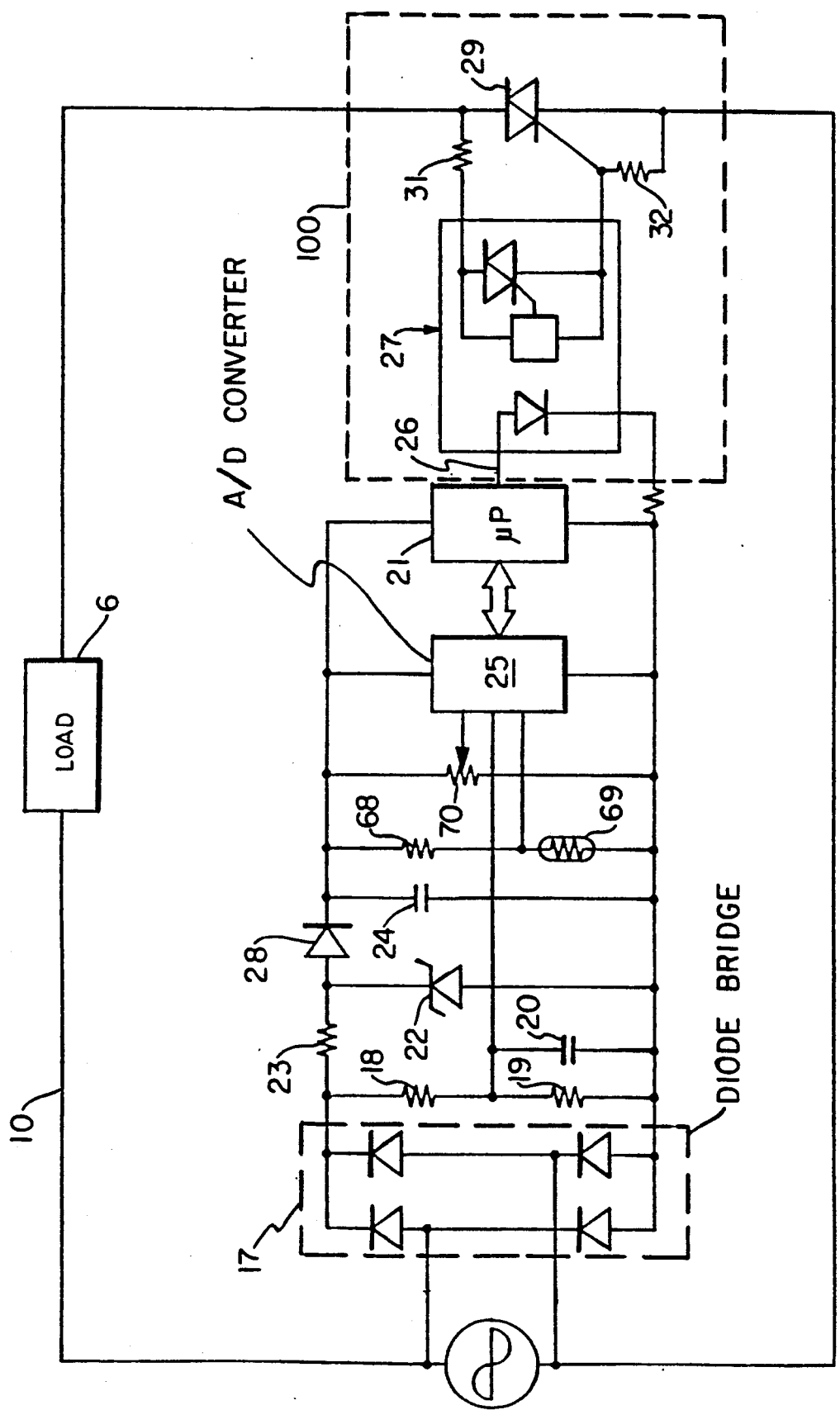
FIG. 5 illustrates an electronic circuit associated with each dissipative load, formed of a receiver and a power control unit that includes a microprocessor circuit may be integrated into the control system depicted in FIG. 1.

FIG. 5 illustrates the circuit of one form of embodiment of the PDM receiver 8 and control unit 9 of the control system shown in FIG. 1.

As illustrated in FIG. 5, the voltage in the sector 10 is rectified by a diode bridge 17 connected to a voltage divider that is formed by the resistors 18 and 19. The attenuated voltage is filtered by a capacity 20 and then sent to an analog-to-digital converter 25 connected to a microprocessor 21. When the present invention is applied to a temperature controller such as a thermostat, the thermostat can be realized by a resistor 68 connected to a thermistor 69, as shown in FIG. 5, for indicating an ambient temperature. A potentiometer 70 is provided for setting a reference temperature which is transmitted to the microprocessor 21. It can be noted that the voltage drop on resistor 19 is representative of the voltage level of the sector 10. The voltage drop on resistor 19 which is digitized by the converter 25 is analyzed by the microprocessor 21 in terms of the voltage line of the sector 10, the duration of the voltage drop of the sector 10 and the voltage gradient of the sector 10 and the number of voltage drops. The microprocessor 21 is connected, in a known manner, to memory units.

This microprocessor comprises an output 26 that feeds an optical isolation circuit and a zero detector 27 such as a MOC3063 integrated circuit made by MOTOROLA (Trade Mark), and a switch 29 such as a triac 29 through which the voltage in the sector 10 is applied to the electric power dissipative load 6. The circuit 27 allows the power circuit (triac 29) of the control circuit (microprocessor 21) to be electrically isolated. The trigger current is supplied to the triac 29 through a resistance 31 that limits this current, whereas a delaying resistance 32 ensures that the switching of the triac 29 does not occur too rapidly. The signal present at the output 26 of the microprocessor 21 is typically a series of pulses modulated in duration that determine the duty cycle of the voltage in the sector 10, transmitted to the load 6 through the triac 29.

Thus, the triac 29 could be switched by the microprocessor 21 according to the signal that it receives from converter 25 to limit the duty cycle of the voltage in the sector 10 that reaches the electric load 6. In this manner, the level of the average power applied to this load 6 is controlled. For example, the voltage present in the sector 10 may be switched to 0 or 100%. It can also be switched according to a 0 to 100% duty cycle every 20 seconds. The voltage of the sector may also be switched within a smaller duty cycle, between 0 and 80%, following a particular signature sent through the voltage line and detected by the PDM receiver, for example. Periodic disconnection of the voltage applied to the radiator, water heater or other load is another possibility.

Alternatively, the output 26 of the microprocessor 21 can be used to switch a relay, in which case the switching circuit 100 is then replaced by an electromechanical or solid state relay such as a semiconductor device.

The voltage rectified by the diode bridge 17 serves to establish a regulated voltage that supplies both the digital-to-analog converter 25 and the microprocessor 21 (FIG. 5). This regulated tension is obtained from the voltage rectified by the resistor 23, the Zener diode 22 and by the capacitor 24. The tension divider formed by resistors 18 and 19 is protected by a diode 28.

Since an important number of loads fed by the distribution network is controlled, it is proper that the reduction of their average power commanded by a drop in the level of supply voltage, and the return to a normal power supply level commanded by the microprocessor 21, should be gradual.

To this effect, it could become possible to predict a statistical delay in, for example, each microprocessor 21. Thus, the reduction of the average power applied to different loads and the re-establishment of a normal supply to the load will be distributed in such a way as to avoid power transients on the electrical distributor network which could be caused by sudden disconnection and reconnection of loads.

The control through a drop in the level of supply voltage for a given duration of time is simple, and offers the advantage of allowing such a voltage decrease to be transmitted through the transformers of an electric energy distribution network. Thus, a fluent control of electric power consumption is permitted.

Figures 6A, 6B:
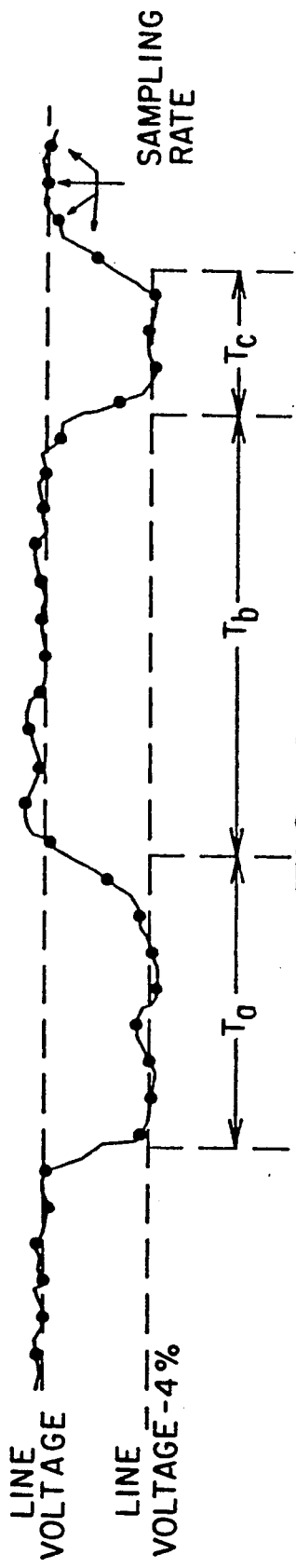
FIG. 6A is a schematic diagram illustrating a pulse duration modulation signal in the level of supply voltage according to the present invention.
FIG. 6B is a table illustrating how the signals shown in FIG. 6A are interpreted by the controller operating a thermostat according to the present invention.

FIG. 6A is an example of a PDM signal, in terms of the root mean square value of alternating current that can be supplied. In order to filter any noise that might occur, the microprocessor 21 expect two drops of voltage defined as one drop of about 4% of the voltage during the time Ta then, after a delay of Tb, another drop of about 4% of the voltage during the time Tc. Those times, Ta, Tb and Tc, that make up a signature of the PDM signal, can be of different values according to the type of energy saving that is required. The points that appear on the signature correspond to the sampling rate of the microprocessor 21.

FIG. 6B shows an example of the different values of Ta, Tb and Tc that make up a signature of the PDM signal and the type of energy saving corresponding to that signature. For a signature of Ta, Tb, Tc equal to respectively 90, 180 and 60 seconds, the thermostat responds by limiting its setting temperature to 20° C. for three hours in a coercive way, i.e. the consumer cannot override it. For a signature of Ta, Tb, Tc equal to respectively 90, 180 and 120 seconds, the thermostat responds by decreasing its setting temperature by 1° C. in a non-coercive way (the user can refuse it) for three hours. For a signature of Ta, Tb, Tc equal to respectively 120, 180 and 30 seconds, the thermostat is completely off for two hours. The signature might consist of Ta only or the combination of Ta, Tb, Tc or a more complex combination of intervals. When the control action which follows the detection of a signature has been completed, the system returns to normal function.

Alternatively, it is possible to vary the voltage level reduction characteristics such as amplitude, duration and gradient. This allows the control of different types of loads. For example, a PDM signal with a 5% voltage decrease lasting one minute could indicate a 50% reduction of the average power transmitted to electric radiators, whereas a 5% voltage decrease lasting two minutes could control the passage from electric heating to a back-up heater that uses gas, oil, or other. There are many possibilities. However, this method presents definite advantages over a binary transmission.

A modulation constituted of a momentary drop in the level of supply voltage for a specific duration can be done by computer (within the different transformation stations), so as to permit a control of power applied to the loads 6 by region. A centralized computer control may command a simultaneous voltage decrease within several statistically chosen transformation stations for reducing the level of average power applied to load within the corresponding regions of the energy distribution network.

Moreover, the electronic controllers (the PDM receiver 8 and the power control unit 9) could be conceived to allow a local, manual control, by a user, in order to reduce the level of average power consumed when it is desired that electricity consumption be economical. It should also be mentioned that electronic controller circuits could be implemented in a hybrid analog and digital way.

It should be noted that when the dissipative power loads are electric radiators, the reduction in the level of average power that is transmitted to the radiators has, as its only inconvenience to the consumer, a slower rate of heating. However, substantial energy savings during peak hours or periods of great electricity consumption demonstrate the benefits to the distribution network of this reduction in the average power level. Other changes, such as water heaters or incandescent lighting systems also benefit similarly.

Figure 7:
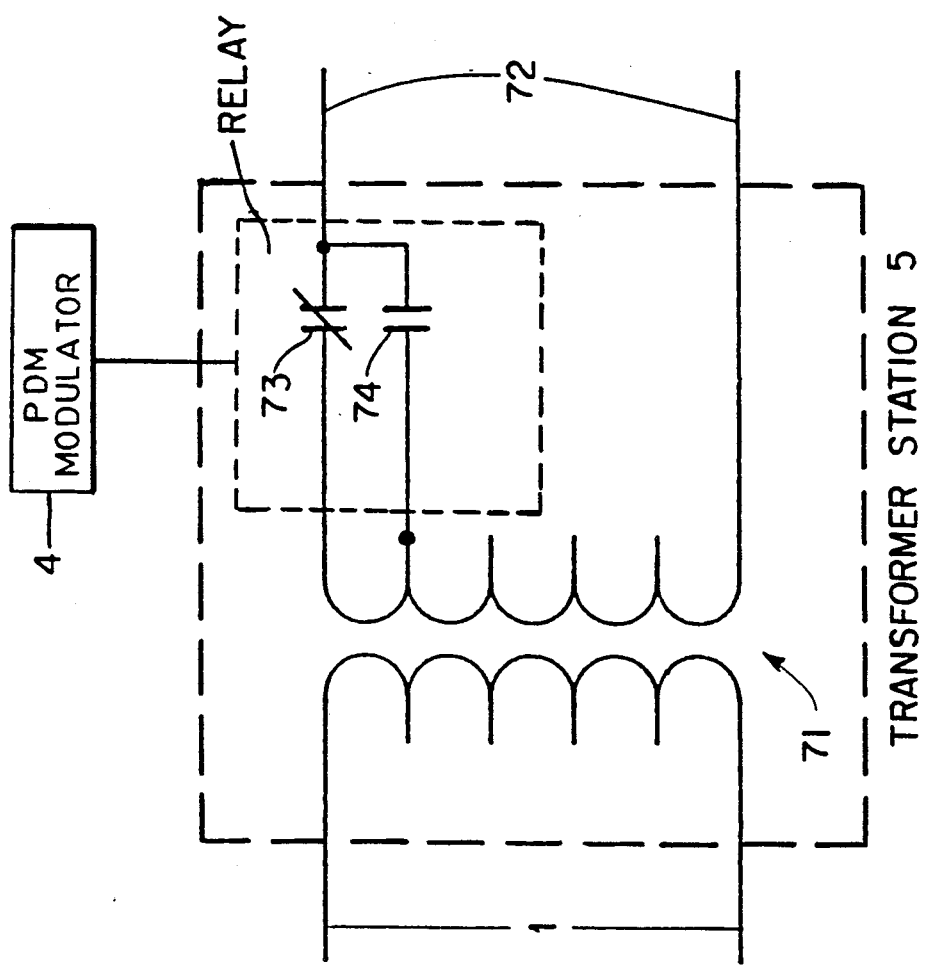
FIG. 7 illustrates schematically an apparatus for modulating said pulse duration modulation signal in the supply voltage of the distribution network according to the present invention.

Referring now to FIG. 7, there is shown a particular manner of achieving a momentary voltage drop of the power line. In this case, transformer station 5 will be exemplified. The transformer 71 sends supply voltage to the receiver by its secondary output 72 which is provided with two relays. One of these relays 73 is connected in series with the secondary output, and is normally closed. The other of these relays 74 is normally opened, and is connected in parallel with the relay 74 with one of its ends tapped along the secondary winding.

When the relay 73 is closed, then the relay 74 is opened and vice versa. When a PDM signal is commanded by the PDM modulator 4, then the relay 73 is momentarily opened and the relay 74 is momentarily closed to provide said momentary decrease of the alternating voltage level. Alternatively, the relays or any corresponding moving tap could be placed in the primary winding 1. The transformer 71 could be an autotransformer.

Figure 8A:
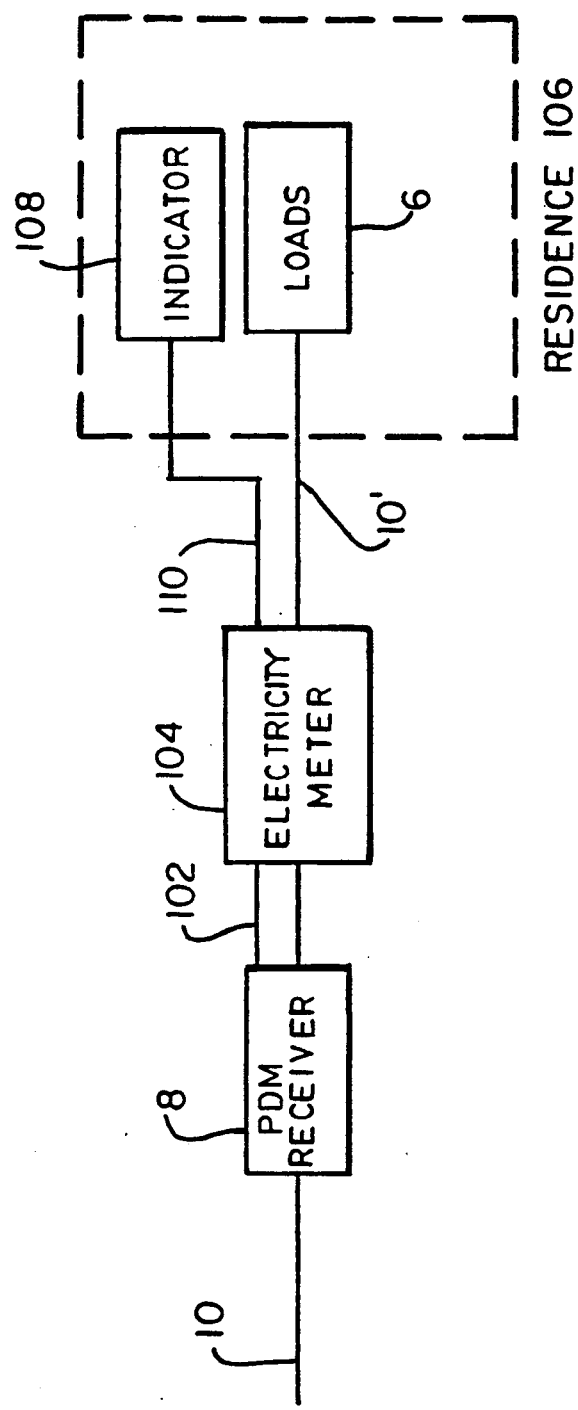
FIG. 8A is a block diagram representing a system for controlling the electricity meter of a residence according to the present invention.

Referring now to FIG. 8A, there is shown a system for controlling the electricity meter 104 of a residence 106. The electricity meter 104 measures consumption of electrical energy according to a predetermined scale of charges. The system comprises a PDM receiver 8 for detecting a PDM signal in the level of the supply voltage present on the sector 10. The PDM receiver 8 generates a low power signal via the connection 102 when the PDM signal is detected. This signal activates the electricity meter 104 so that it modifies its scale of charges, and so that a signal be generated via the connection 110 to activate an indicator 108 that indicates to the occupant of the residence 106 the new scale of charges. The supply voltage 10 is fed to the meter 104 which transmits it to the loads 6 by means of the line 10'.

At least one type of signature in the level of supply voltage is interpreted by the PDM receiver 8 as a signature concerning the scale of charges of the electricity meter 104. The electricity meter 104 measures the consumption of electrical energy of the loads 6. When the PDM signal in the level of supply voltage corresponds to the type of signature concerning the meter 104, then a signal is generated via the connection 102 to change the scale of charges.

FIG. 8B shows a block diagram of a digital electricity meter to explain how the scale of charges (or tarification) is changed. The power meter 111 sends to the digital processor unit 113 via an analog-to-digital converter 112, the measurement of the power drawn by the loads 6 in the residence 106. The digital processing unit 113 evaluates the tarification according to the energy consumed and the type of signature fed by the connection 102 and displayed in unit 114. The tarification unit 115 which receives its information from the PDM receiver 8 via the connection 102 indicates to the digital processing unit 113 and to the residence via the connection 110 the percentage of rise or lowering of the scale of charges. Alternatively, the digital processing unit 113 and the converter 112 can be replaced by an analog device.

Although the invention has been described by preferred embodiments, those embodiments may be modified at will so as to respect the following claims without loosing perspective of the present invention.

In particular, another type of PDM signal could replace the voltage level decrease suggested by the preferred embodiments. One example of the latter is a voltage level increase having characteristics similar to the voltage decrease.

We claim:

1. A controller associated with a dissipative electric load, that controls the level of average power applied to the aforesaid load by an electric energy distribution network that supplies said dissipative load with an AC supply voltage having a typical frequency value of 60 Hz via high power transformers that filter AC signals from high frequency signals, comprising:
   (i) means for detecting a predetermined pulse duration modulation signal embedded in the level of the supply voltage provided by the distribution network, said duration signal being a low frequency signal having a minimum width of greater than several seconds so that said duration signal may be transmitted through said high power transformers, said duration signal having a duration indicative of a command for determining the level of average power applied to said load; and
   (ii) means for transmitting electric power originating from the distribution network to the load, the aforesaid means for transmitting comprising means for reducing the level of average power transmitted to the load, in response to said duration signal which is indicative of the command as detected by said means for detecting.

2. A controller according to claim 1, characterized in such a way that it comprises manual control means which allow a user to neutralize said means for reducing the level of average power.

3. A controller according to claim 1, characterized in such a way that the aforesaid means for reducing comprise means for reducing the level of average power during a predetermined interval of time, in response to a detection of said pulse duration modulation signal in the level of supply voltage.

4. A controller according to claim 1, characterized in such a way that the aforesaid means for reducing comprise means for reducing the level of average power when an initial pulse duration modulation signal in the level of supply voltage is detected by the aforesaid means for detecting until the aforesaid means for detecting detect a second pulse duration modulation signal in the level of supply voltage supplied by the distribution network.

5. A controller according to claim 1, characterized in such a way that:
   (i) the aforesaid supply voltage is an alternating voltage;
   (ii) the aforesaid means for transmitting comprise means for transmitting said supply voltage to the dissipative load; and
   (iii) the aforesaid means for reducing comprise means for reducing the duty cycle of the aforesaid alternating voltage transmitted to the dissipative load through said means for transmitting.

6. A controller according to claim 1, characterized in such a way that the aforesaid means for reducing comprise means for periodically interrupting transmission of the supply voltage to the dissipative load through said means for transmitting.

7. A controller according to claim 1, characterized in such a way that the aforesaid means for reducing comprise means for reducing the level of average power transmitted to the load by the aforesaid means for transmitting after a statistical delay which follows a detection of said pulse duration modulation signal in the level of supply voltage.

8. A controller according to claim 7, characterized in such a way that it comprises means for controlling passage from transmission of a reduced average power level to the load to transmission of a non-reduced average power to the load, and for delaying the aforesaid passage of a statistical delay after that said passage has been triggered.

9. A controller according to claim 1, characterized in such a way that:
   (i) said means for detecting comprise means for detecting different durations in the level of supply voltage;
   (ii) said means for reducing the level of average power comprise means for reducing the level of average power in response to one of said different durations that corresponds to said load.

10. A controller according to claim 1, comprising means for controlling a transition between transmission of a reduced average power level to said load to transmission of a non reduced average power level to said load according to intermediary steps of reduced average power levels.

11. A controller associated with a group of dissipative electric power loads that controls the level of average power applied to the aforesaid group by an electric energy distribution network that provides said group of dissipative loads with an AC supply voltage having a typical frequency value of 60 Hz via high power transformers that filter AC signals from high frequency signals, comprising:
   (i) means for detecting a predetermined pulse duration modulation signal embedded in the level of supply voltage supplied by said electric energy distribution network, said duration signal being a low frequency signal having a minimum width of greater than several seconds so that said duration signal may be transmitted through said high power transformers, said duration signal having a duration indicative of a command for determining the level of average power applied to said group of loads; and
   (ii) means for transmitting electric power originating from the distribution network to said loads of the aforesaid group, the aforesaid means for transmitting comprise means for reducing the level of average power transmitted to the group of loads in response to said duration signal which is indicative of the command as detected by said means for detecting.

12. A controller according to claim 11, characterized in such a way that the aforesaid means for reducing comprise means for reducing the level of average power transmitted to said loads according to a given sequence.

13. A controller according to claim 11, characterized in such a way that:
(i) the aforesaid means for detecting comprise means for detecting various durations in the pulse duration modulation signal in the level of the supply voltage;
(ii) said means for reducing comprise means for reducing the level of average power transmitted to at least one of the aforesaid loads that correspond to one of said durations in the pulse duration modulation signal in the level of said supply voltage.

14. A controller according to claim 11, where one of said loads in an air conditioner activated with respect to a reference temperature, further comprising means for modifying said reference temperature.

15. A controller according to claim 11, where one of said loads is an air conditioner activated with respect to a reference temperature, further comprising means for limiting said reference temperature according to a predetermined maximum reference temperature.

16. A controller according to claim 11, characterized in such a way that the aforesaid means for reducing comprise means for interrupting transmission of electric power to a first load of the aforesaid group, and for transmitting electric power to a second load of said group, that consumes a different amount of power than said first load.

17. A control system for controlling the level of average electric power applied to a dissipative load by an electric energy distribution network that provides said dissipative load with an AC supply voltage having a typical frequency value of 60 Hz via high power transformers that filter AC signals from high frequency signals, comprising:
(i) means for modulating a predetermined pulse duration modulation signal in the level of supply voltage provided by the distribution network; and
(ii) a controller associated with the aforesaid load, comprising:
 (a) means for detecting the aforesaid pulse duration modulation signal embedded in the level of supply voltage, said duration signal being a low frequency signal having a minimum width of at least about 30 seconds so that said duration signal may be transmitted through said high power transformers, said duration signal having a duration indicative of a command for determining the level of average power applied to said load; and
 (b) means for transmitting electric power, that originates from the distribution network to the load, the aforesaid means for transmitting comprising means for reducing the level of average power transmitted to said load in response to said duration signal which is indicative of the command as detected by said means for detecting.

18. A control system according to claim 17, characterized in such a way that the aforesaid means for modulating comprise means for modulating the aforesaid pulse duration modulation signal in the level of supply voltage per regions of said electric energy distribution network.

19. A control system according to claim 18, characterized in such a way that the aforesaid means for modulating comprise means for statistically choosing at least one of said regions of the electric energy distribution network where said pulse duration modulation signal is modulated.

20. A control system according to claim 7, characterized in such a way that said means for modulating comprise means for modulating a gradual pulse duration modulation signal in the level of supply voltage.

21. A control system according to claim 20, characterized in such a way that the aforesaid means for detecting comprise means for detecting a pulse duration in the level of supply voltage, that varies gradually.

22. A control system according to claim 17, characterized in such a way that:
(i) the aforesaid means for modulating comprise means for producing different durations in the level of supply voltage;
(ii) said means for detecting of the aforesaid controller comprise means for detecting at least one of said durations; and
(iii) said means for reducing comprise means for reducing the level of average power transmitted to the load only when said one duration is detected.

23. A control system according to claim 17, characterized in such a way that the aforesaid means for modulating comprise means for producing a decrease in the level of supply voltage for a given duration.

24. A control system according to claim 17, characterized in such a way that:
(i) the aforesaid distribution network is an alternating current distribution network and comprises several transformer stations; and
(ii) said means for modulating a pulse duration modulation signal in the level of supply voltage comprise means for producing a pulse duration modulation signal in the level of supply voltage within at least one of the aforesaid transformer stations.

25. A method of controlling the level of average electrical power applied to dissipative loads by an electric energy distribution network that provides said dissipative loads with an AC supply voltage having a typical frequency value of 60 Hz via high power transformers that filter AC signals from high frequency signals, comprises the following steps of:
(i) modulation of a predetermined pulse duration modulation signal in the level of supply voltage provided by the distribution network to the dissipative loads, said duration modulation signal corresponding to at least one of said loads, said duration signal being a low frequency signal having a minimum width of at least several seconds so that said duration signal may be transmitted through said high power transformers, said duration signal having a duration indicative of a command for determining the level of average power applied to said at least one load;
(ii) detection of the aforesaid pulse duration modulation signal in the level of supply voltage at the level of each of said dissipative loads; and
(iii) reduction of electric power provided by the distribution network to said at least one load in response to said duration signal which is indicative of the command as detected by said means for detecting.

26. A control method according to claim 25, characterized in such a way that the aforesaid step of modulation comprises modulation of a pulse duration modulation signal in the level of supply voltage per regions of the distribution network.

27. A control method according to claim 26, characterized in such a way that:
    (i) the distribution network comprises several transformer stations, and
    (ii) the aforesaid modulation comprises modulation of a pulse duration modulation signal in the level of supply voltage of one or several of the aforesaid transformer stations.

28. A control method according to clam 25, characterized in such a way that:
    (i) said step of modulating comprises modulation of several durations in the pulse duration modulation signal in the level of supply voltage, said durations corresponding to particular loads of said loads;
    (ii) said step of detection comprises detection of said durations at the level of each of said loads; and
    (iii) said step of reduction comprises reduction of the level of average power transmitted to said particular loads.

29. A control method according to claim 25, characterized in such a way that the aforesaid step of modulation comprises production of a gradual decrease in the level of supply voltage provided by the distribution network.

30. A controller, associated with an electricity meter of a residence that measures consumption of electrical energy according to a predetermined scale of charges, said electrical energy being supplied to said residence by an electric energy distribution network that supplies an AC supply voltage having a typical frequency value of 60 Hz high power transformers that filter AC signals from high frequency signals, comprising:

means for detecting a predetermined pulse duration modulation signal embedded in the level of supply voltage provided to said residence, said duration signal being a lower frequency signal having a minimum width of greater than several seconds so that said duration signal can be transmitted through said high power transformers, said duration signal having a duration indicative of a command for determining said scale of charges by which said electrical energy is measured by means of said meter, and generating a signal accordingly; and means connected to said electricity meter for modifying said scale of charges when said signal is generated.

31. A controller of a level of average power applied to a dissipative electric lad by an electric energy distribution network that supplies the dissipative load with a supply voltage, comprising:

means for transmitting electrical power originating from the distribution network to the load;

means for detecting pulse variations of different durations greater than several seconds in the level of the supply voltage provided by the distribution network;

means for interpreting the detected pulse variations to determine whether a change is be effected; and command means responsive to said interpreting means for instructing that the change be effected irrespective of the level of the supply voltage, the command means including the transmitting means being responsive to said interpreting means for varying the level of the average power transmitted to the load irrespective of the level of the supply voltage.

32. A controller according to claim 31, wherein the command means includes means for instructing that a change in a scale of charges pertaining to a means for measuring consumption be effected.

* * * * *